Dec. 8, 1931.   W. BEUSCH   1,835,750
INDUCTION METER
Filed March 20, 1929
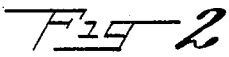
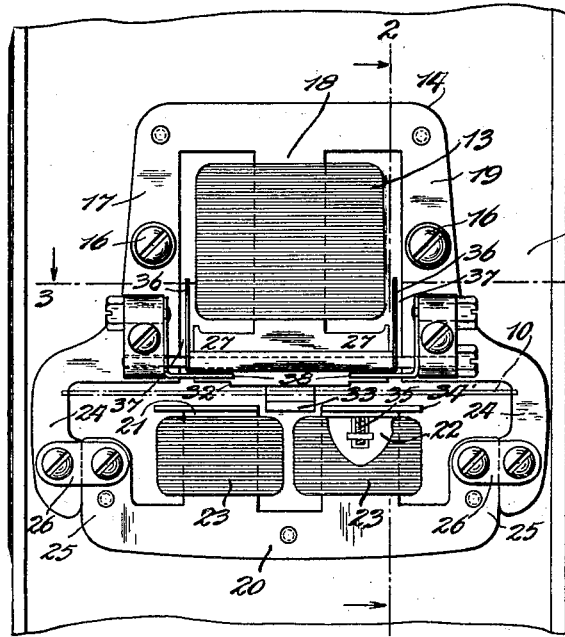
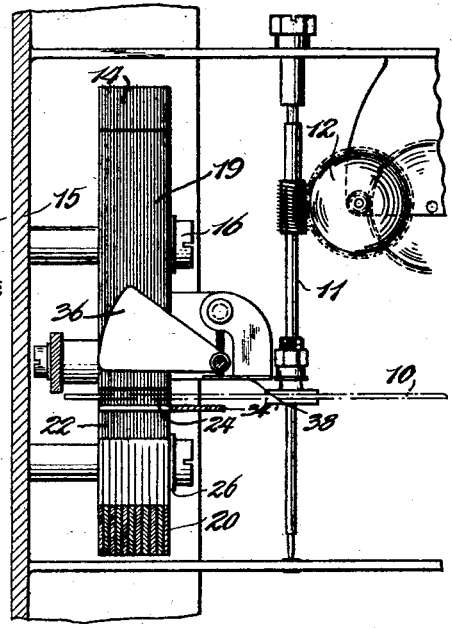
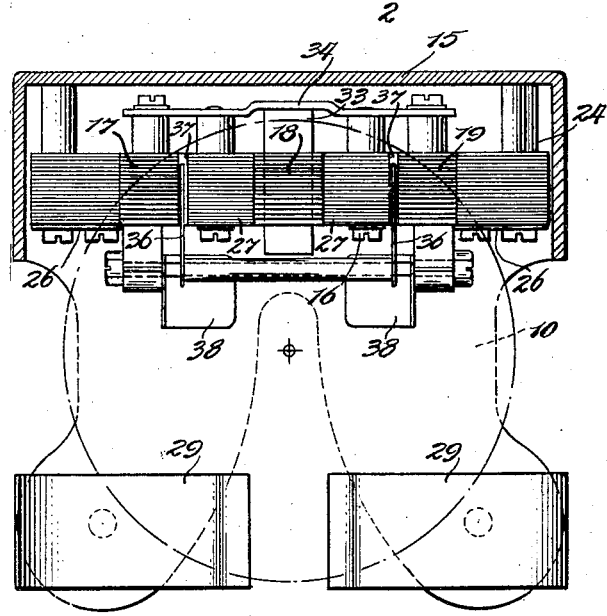
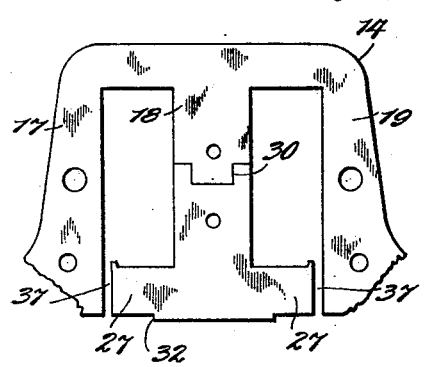
INVENTOR
W. Beusch
BY
John D. Morgan
ATTORNEY Patented Dec. 8, 1931

1,835,750

UNITED STATES PATENT OFFICE

WILLI BEUSCH, OF ZUG, SWITZERLAND, ASSIGNOR TO LANDIS & GYR, A.-G., A JOINT-STOCK COMPANY OF SWITZERLAND

INDUCTION METER

Application filed March 20, 1929, Serial No. 348,578, and in Switzerland March 24, 1928.

The invention relates to new and useful improvements in electricity meters and more especially to novel and useful improvements in the driving systems of induction meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a front elevation of an electricity meter embodying the present invention;

Fig. 2 is a section taken on the line 2—2 of Fig. 1 with the meter coils omitted;

Fig. 3 is a section taken on the line 3—3 of Fig. 1, the meter coils being omitted; and Fig. 4 is a detail of a portion of the voltage core of the meter.

The present invention is directed to the provision of an electric meter which is particularly free from errors and is practically unaffected by external or stray magnetic fields which, with the usual and prior construction of meters would cause serious errors in the registration. The invention further provides an exceedingly compact, relatively light, meter which is capable of being heavily overloaded without damage thereto. Further, the invention provides a meter that can be assembled and mounted very readily and is thereafter easily adjusted.

According to the present preferred embodiment of my invention there are provided the usual meter disc, spindle and registering train, suitably mounted in the meter frame, and the meter disc is driven by means of current and voltage coils and cores. Preferably, there is provided a voltage coil having three poles, and arranged on one side of the meter disc, a suitable voltage coil being wound around the central pole of this core. On the other side of the disc is provided a current coil and core, and preferably this core has two poles, each provided with a current coil.

Means are provided for reducing or eliminating the effects of stray or external magnetic fields on the meter and preferably these comprise depending portions on the outside poles of the voltage coil core which connect these poles with the sides of the current coil core. Means are also provided for enlarging the surface of the poles of the current coil core and may comprise plates secured to the faces of the poles of the current coil core.

An extension is provided on the central pole of the voltage coil core, which extension is adjacent the meter disc and extends over the poles of the current coil core to provide a counterpole therefor. To facilitate assembly of the voltage coil and core, a mortise and tenon joint is provided midway of the central pole of the voltage coil core, and so positioned, that the effects of stray fields are further reduced.

A counterpole for the voltage coil core is also provided, in the preferred embodiment, and to increase its effect, a projection on the extension of the central pole may be provided adjacent the meter disc.

For compensating and adjusting the meter for phase displacement and driving torque, the extension of the central pole of the voltage coil core extends very close to the outside poles of the core and in the intervening spaces between the extension and the outside poles are provided variably positionable copper segments, while near the bottom face of the extension are provided variably positionable iron vanes for adjusting the driving torque.

As illustrated by the accompanying drawings, there is provided the usual meter disc 10 and spindle 11 suitably mounted in bearings and driving the registering train 12.

For driving the meter disc in accordance with the energy consumed in the circuit, there is provided, in the present embodiment, a voltage coil 13 and core 14 mounted in the meter frame 15, by screws 16, the core preferably being formed with three poles 17, 18 and 19 lying in a single plane. On the other side of disc 10 is provided a two-poled core 20, over which poles 21 and 22 are fitted the current coils 23. For reducing or eliminating the effect of stray or external magnetic fields, there are formed depending lugs 24, preferably formed integrally with the outside poles 17 and 19 of the voltage core, these lugs having a direct magnetic connection with the ends 25 of the current core by straps 26.

The central pole 18 of the voltage core extends between the other two poles and at its ends is provided with lateral extensions 27 which extend nearly to the outside poles 17 and 19, leaving small air spaces between the extensions and the side poles. Extensions 27 are of sufficient length to extend over the poles 21, 22 of the current coil core and thereby form a counterpole for the current core. These lateral extensions are preferably separably joined to the central pole 18 of the voltage core by a mortise and tenon joint 30 so positioned that the joint occurs centrally of voltage coil 13, thereby tending to reduce the effect of stray magnetic fields. Braking means, such as magnets 29 are also provided.

Extensions 27 are provided with a small projection 32 on the side nearest disc 10 and cooperates with a counterpole 33 for the central pole 18 of the voltage core, the counterpole being located between the poles 21, 22 of the current core and mounted on the voltage core by bracket 34.

Means are provided for increasing the area of the faces of the current core poles 21, 22 and as shown comprise small plates 34' larger than the face of the poles and extending laterally and forwardly thereof, and secured to the poles by bolts 35.

Means are provided for phase compensation of the meter and, as embodied, comprise copper vanes 36, adjustably mounted in air gaps 37 and provided with suitable means for holding them in adjusted position. For varying the driving torque of the meter, iron vanes 38 are provided and are adjustably mounted so they can be variably positioned with respect to the meter disc 10.

The invention in its broader aspects is not limited to the specific mechanisms shown and described but departures may be made therefrom within the scope of the accompanying claims without departing from the principles of the invention and without sacrificing its chief advantages.

What I claim is:—

1. In an induction meter, the combination including a voltage magnet having a core composed of a central and two outer limbs and a voltage coil surrounding the central limb, a current magnet having a core with pole pieces mounted adjacent to the voltage core and directly and magnetically connected therewith, the central limb of the voltage core being divided midway and centrally of the voltage coil to facilitate assembly of the voltage magnet and lateral extensions integral with the central limb of the voltage core and extending close to the outer limbs and overlying the pole pieces of the current core.

2. In an induction meter, the combination including voltage and current magnets having their cores interconnected to reduce the effects of stray fields, the voltage coil being mounted on one limb of the voltage core, said limb being jointed midway and centrally of the voltage coil, thereby facilitating assembly of the voltage magnet and reducing magnetic losses at the joint.

In testimony whereof, I have signed my name to this specification.

WILLI BEUSCH.